United States Patent [19]

Lungershausen et al.

[11] Patent Number: 5,257,118
[45] Date of Patent: Oct. 26, 1993

[54] METHOD FOR HOLOGRAPHICALLY COMBINING LASER BEAMS

[75] Inventors: Arnold W. Lungershausen, West Henrietta; Stephen C. Arnold, Honeoye Falls, both of N.Y.

[73] Assignee: Eastman Kodak Company, Rochester, N.Y.

[21] Appl. No.: 827,671

[22] Filed: Jan. 29, 1992

[51] Int. Cl.⁵ .............................................. G03H 1/04
[52] U.S. Cl. ....................................... 359/10; 359/28; 359/35
[58] Field of Search .................... 359/10, 11, 28, 29, 359/32, 35

[56] References Cited

U.S. PATENT DOCUMENTS

| | | | |
|---|---|---|---|
| 3,796,476 | 3/1974 | Frosch et al. | 359/10 |
| 4,857,425 | 8/1989 | Phillips | 359/10 |
| 4,984,856 | 1/1991 | Moss et al. | 359/10 |

OTHER PUBLICATIONS

R. Collier, et al. *Optical Holography*, Section 13.3.2 at pp. 370–373, Academic Press (1971).
H. Kogelnik, "Holographic Image Projection Through Inhomogenous Media," Bell System Tech. Briefs, vol. 44, pp. 2451–2455 (1965).

*Primary Examiner*—Bruce Y. Arnold
*Assistant Examiner*—J. P. Ryan
*Attorney, Agent, or Firm*—Stephen C. Kaufman

[57] ABSTRACT

A holographic recording of the interference between an object laser beam and a reference laser beam is used to combine the amplitudes of multiple laser beams which are conjugates of the reference beam into a single laser beam which is conjugate of the object beam. An optical device in the form of a prism has an entrance face with a diffusion surface, and an exit face with a light sensitive recording medium. An object beam incident on the diffusion surface is scattered over the recording medium, in interference with a reference beam simultaneously incident at an angle $\theta$ onto the same medium. Multiple beams, conjugate to the reference beam, incident at angles $\theta \pm 4°$ on the hologram thus created on the recording medium are diffracted by the hologram and caused to combine at the diffusion surface to form a signal output beam, conjugate to the original object beam and having an amplitude which is proportional to the sum of the separate amplitudes of the combined beams.

9 Claims, 3 Drawing Sheets

METHOD FOR HOLOGRAPHICALLY COMBINING LASER BEAMS

BACKGROUND OF THE INVENTION

This invention relates to a novel method for holographically combining multiple laser beams into a single, combined amplitude laser beam.

INTRODUCTION TO THE INVENTION

A basic theory on holographic devices and methods for holographic recording and reconstructing, is known. Reference may be made, for example, to Goodman, J. S.: Introduction to Fourier Optics, Chap. 8, McGraw-Hill Book Company, New York, 1968; Meyer-Arendt, J. R.: Introduction to Classical and Modern Optics, Chap. 4.4, Prentice-Hall, Inc., Englewood Cliffs, N.J., 1972; or, Collier, R. J., et al: Optical Holography, Chap 1, Academic Press, New York, 1971.

SUMMARY OF THE INVENTION

Our work is to extend and exploit the potentialities of application inherent in a theoretical elaboration of holography. To this end, we now disclose a novel method for holographically combining multiple laser beams into a single, combined amplitude laser beam.

The novel method of the present invention comprises the steps of:
1) providing an optical device comprising:
   a) a support substrate having entrance and exit faces and comprising a monolithic device;
   b) means providing a diffusion surface on the entrance face; and
   c) means providing a light sensitive recording medium on the exit face comprising;
f the support structure and the entrance and the exit faces comprising a monolitic device;
2) constructing a holographic recording by simultaneously:
   (i) directing a reference beam to the light sensitive recording medium; and
   (ii) directing an input beam through the entrance face for interfering with the reference beam at the exit face; and
3) directing a plurality of conjugate reference beams to the holographic recording, thereby providing a combined conjugate output beam.

The method also preferably comprises a further step of selectively combining conjugate reference beams for reconstructing the input beam in accordance with predetermined intensity levels, thereby providing a digital to analog capability.

The method of the present invention has the advantages of realizing a laser beam combiner capability, or an optical digital to analog (DAC) capability.

BRIEF DESCRIPTION OF THE DRAWINGS

The invention is illustrated in the accompanying drawing, in which.

DETAILED DESCRIPTION OF THE INVENTION

Figure 1:
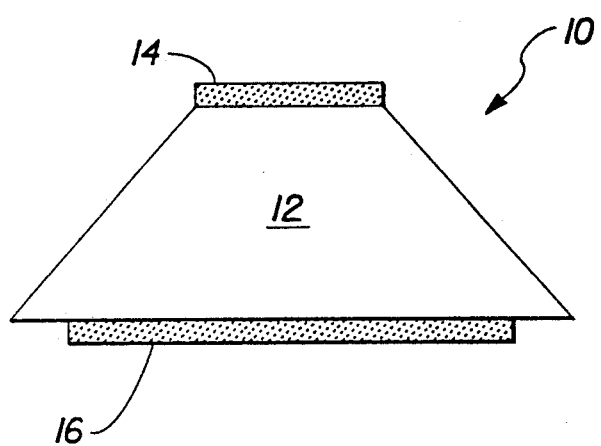
FIG. 1 shows a holographic device usable for the method of the present invention.

The method of the present invention preferably utilizes a holographic device of a type shown in FIG. 1 as holographic device 10. Details on the holographic device 10 are first disclosed, followed by a disclosure of the method of the present invention (FIGS. 2-4), which utilizes the holographic device 10.

In overview, the FIG. 1 holographic device 10 comprises a support substrate 12; a support substrate entrance face 14; and, a support substrate exit face 16 comprising a light sensitive recording medium. Individual details on the FIG. 1 holographic device 10 are now disclosed.

THE SUPPORT SUBSTRATE

The support substrate 12 may comprise a light transmissive block, for example, a glass block, or a conventional prism. We employ a prism in a preferred mode, for reasons of support stability, optical properties and economics. A typical such prism has a length from approximately 7.0 cm. to 8.0 cm.; a depth of approximately 3.0 cm. to 4.0 cm.; a width from approximately 2.5 cm. to 3.5 cm.; and, a weight from approximately 200.0 gm. to 300.0 gm., depending on its ultimate use in a particular holographic recording or reconstructing method.

The prism preferably functions as a deviating prism, because, as demonstrated below in the method of utility of the holographic device 10, the deviating prism refracts a reference beam at an appropriate angle.

A suitable prism may comprise a dove prism, although, for example, a Porro prism or a right angle prism may be used.

A suitable prism may be a polarizing prism.

The prism may comprise glass or a crystalline substrate.

A selection of one such particularly characterized prism depends, ultimately, on its use in a particular holographic recording or reconstructing method.

THE ENTRANCE FACE

The support substrate 12 defines the entrance face 14. A diffusion surface is provided on the entrance face 14 which may comprise a scattering medium or, alternatively, it may comprise a periodic structure. For either alternative, the diffusion surface on entrance face 14 functions so that all components of the entrance face 14 provide illumination to a common area i.e., a pupil of the exit face 16.

Preferably, the scattering medium comprises ground glass, that may be etched or ground by conventional techniques directly on the support substrate 12. This action creates a diffusing surface.

Alternatively, one may attach, for example, by way of a conventional optical cement, a discrete ground glass entity, to the support substrate 12, so as to construct a monolithic device.

The scattering medium may comprise an array of point scatterers, or a light sensitive recording medium, for example, a photographic film. These alternative scattering media comprise a diffusing surface that is integral to the holographic device 10.

As just referenced, the entrance face 14 may alternatively comprise a periodi structure, for example, an array of microlenses, or an array of pinhole apertures, or an array of diffractive optical elements. The term "diffusing surface" as used herein contemplates such periodic structure, as well.

Note that for all cases, (i.e., periodic or scattering), an index of refraction of the entrance face 14 is preferably the same as that of the support substrate 12.

THE EXIT FACE

The support substrate 12 defines the exit face 16 which is provided with a light sensitive recording medium.

The light sensitive recording medium may comprise a photoresistive material, or a silver halide, or a dichromated gelatin, or a photo polymer, or a thermoplastic.

The light sensitive recording medium may be applied to the support substrate 12 by way of a conventional coating process, which inherently adheres to the support substrate 12 so that it becomes integral to the holographic device 10, or it may be coated on a separate substrate that later adheres to the support substrate 12.

THE METHOD OF THE PRESENT INVENTION

Figure 2A:
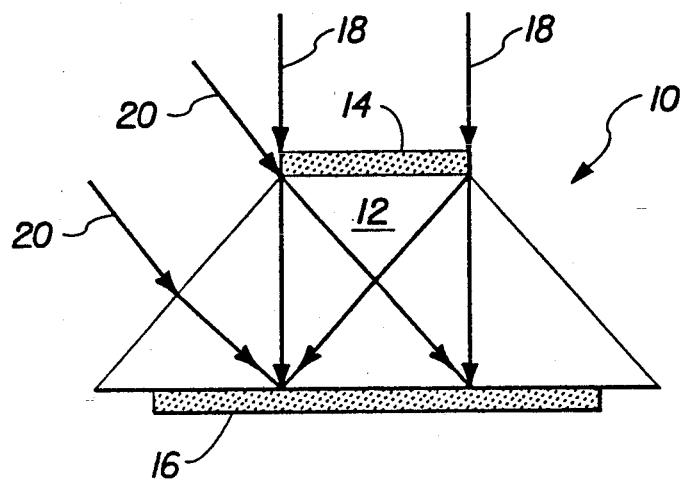
FIGS. 2A, 2B show the holographic device of the FIG. 1 used for holographic recording and reconstructing, respectively.
Figure 2B:
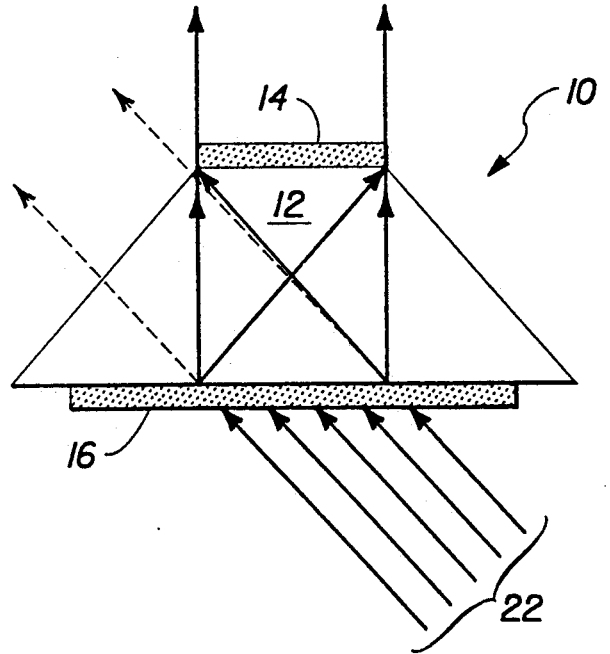

Attention is now directed to FIGS. 2A, 2B, which illustrate a utility of the holographic device 10 in a holographic laser beam combining method of the present invention.

In particular, FIG. 2A illustrates an initial recording of a hologram of the diffusing surface 14. Each diffusing element of the diffusing surface 14 spreads an incident input (object) beam 18 over the whole area of the recording. A reference beam 20 is added to form an interference pattern on the recording material.

Note that since the light from each diffusing element is spread over the entire hologram area, upon reconstruction, each element of the hologram can reconstruct the entire diffusing area, and the beam that illuminates it. If, for example, a collimated beam is used to illuminate the diffusing surface during recording, then a collimated beam is reconstructed in a subsequent reconstructing step. This only works if an exact conjugate (time reversed) version of the original reference beam is used.

FIG. 2B illustrates a reconstructing step of the FIG. 2A hologram. Note, in particular, that FIG. 2B shows a step of directing a plurality of conjugate reference beams to the holographic recording. This action is that of a holographic beam combiner, whereby, for example, one can provide a laser writer generating several times the power available from a single high power diode laser.

Note, furthermore, that a step of selectively combining sundry of the plurality of conjugate reference beams, reconstructs the input (object) beam in accordance with predetermined intensity levels, thereby functioning as an optical digital to analog converter (i.e., an optical DAC).

One important feature of the present method is that it can reconstruct the exact same spatial intensity profile of the wavefront that was recorded in it, and that it is invariant to the lateral position of any of the plurality of conjugate reconstructing beams on the exit face, so long as they are within about 4° of the original reference beam angle.

These capabilities are now expanded upon, by way of a following mathematical disclosure.

HOLOGRAPHIC BEAM COMBINER/OPTICAL DAC

I. Recording Step

Assume some two-dimensional input function, in this case a plane wave with Gaussian amplitude $$f_1(x,y) = A_1 \exp[-\pi(x^2+y^2)/d^2]$$

where x and y are spatial coordinates, and the wave is assumed to be traveling along the z axis; and $A_1$ is the wave amplitude; d is the beam diameter.

This input wave impinges on the entrance face with a complex transmission function $$t_1(x,y) = \exp(i\phi)$$

where $\phi = (2\pi/\lambda)nT$ is the phase;
$\lambda$ is the wavelength;
n is the refractive index of the substrate; and
T is the thickness of the substrate.

The impulse response of the scatterer and media is $$h_1 = \exp[(i\pi/T\lambda)(x^2+y^2)].$$

Figure 3:
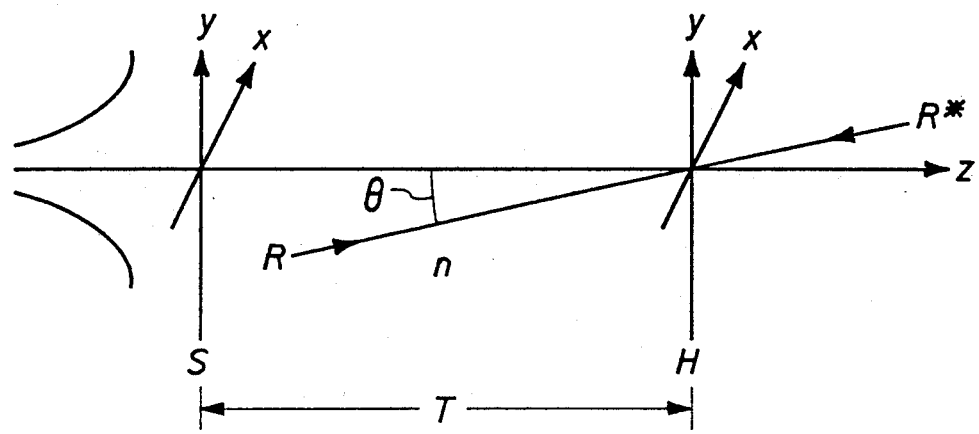
FIG. 3 shows a schematic holographic recording geometry.

This is shown is FIG. 3, where S is the entrance face or input plane for the holographic recording, this is the phase scatterer, and H is the recording plane;
R is a reference wave, and
R* is a conjugate reference wave.

This device can be modeled as a linear shift invariant system (LSI). It is linear since it abides by the principle of superposition as defined by Gaskill. (*Linear Systems, Fourier Transforms and Optics* by Jack D. Gaskill; John Wiley & Sons, New York, 1978, pp. 137–138.) This essentially says that a linear combination of inputs or stimuli to a system result in a linear combination of outputs or responses from the system. Also understood from this is that the system is "independent of the magnitude of the input." (See Gaskill previously cited, p. 139.) In the recording stage this system is also shift invariant, where shift in variance implies that the only effect caused by a spatial shift in the input is an equal spatial shift in the output.

It is not shift invariant in the reconstruction step, which, as will be shown, is of great advantage. The recording step can be completely characterized by this impulse response, since it is an LSI system.

The complex amplitude of the LSI system is the object wavefront that is recorded in the hologram at H in FIG. 3:

$$f_2(x,y) = f_1(x,y)t_1(x,y) * h_1$$

where $f_2$ is the output and * denotes the convolution operation. The convolution operation really describes the Fresnel diffraction caused by the propagation of the original input wave through the scatterer and ensuing media.

The transfer function associated with Fresnel diffraction is found to be $$H_1(\xi,\eta) = F\{h_1(x,y)\}$$

(where $\xi$ and $\eta$ represent spatial frequencies in the x and y directions). This describes the propagation of plane wave components from the input plane to output plane when the Fresnel approximations are valid.

$$F_2(\xi,\eta) = F_1(\xi,\eta) * T_1(\xi,\eta) H_1$$

represents the distribution of plane wave components in the output plane.

To record the hologram at plane H, a plane reference wavefront is combined with the object wavefront $F_2(\xi,\eta)$. This is represented as a complex amplitude $$R(x,y) = A_2 \exp(i2\pi x \xi_r)$$

where $\xi_r = (\sin\theta)/\lambda$, and
where $\theta$ is an angle the reference beam makes at the hologram plane H. In frequency space this could be written as $$R(\xi,\eta) = A_2 \delta(\xi - \xi_r).$$

The recording medium linearly records the intensity in the resulting interference pattern. This intensity is represented as $$\begin{aligned}I &= [F_2(\xi,\eta) + R(\xi,\eta)][F_2^*(\xi,\eta) + R^*(\xi,\eta)]\\ &= F_2(\xi,\eta)F_2^*(\xi,\eta) + R(\xi,\eta)R^*(\xi,\eta) +\\ &\quad F_2(\xi,\eta)R^*(\xi,\eta) + F_2^*(\xi,\eta)R(\xi,\eta).\end{aligned}$$

II. Reconstruction Step

Assume that the transmittance function of the hologram is proportional to the intensity in the recording interference pattern. Reconstruction of the hologram is achieved by illuminating the hologram with the conjugate of the original reference beam $R^*(\xi,\eta)$.

This results in the following wavefront (see FIG. 4).

Figure 4:
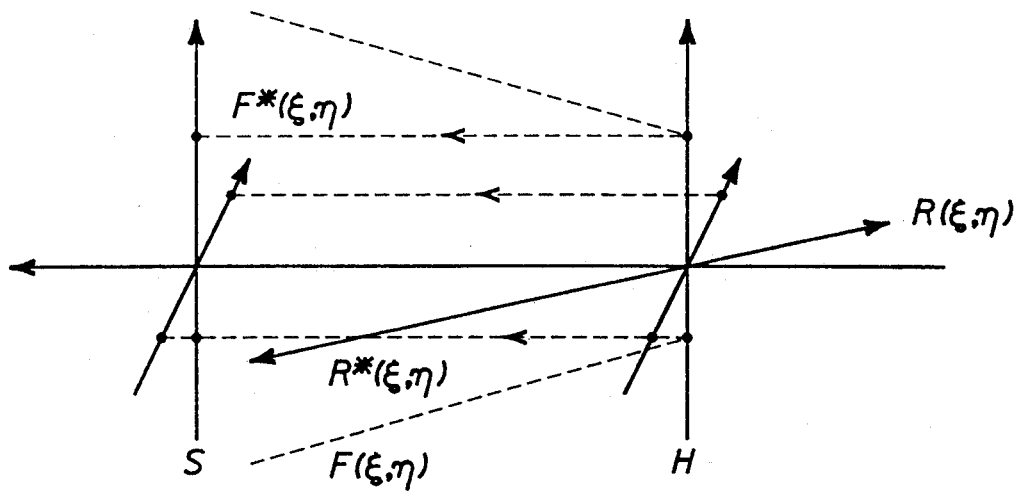
FIG. 4 shows a schematic holographic reconstructing geometry.

In accordance with FIG. 4, we develop the following relationships:

$$\begin{aligned}F_3(\xi,\eta) &= R^*(\xi,\eta)I\\ &= F_2(\xi,\eta)F_2^*(\xi,\eta)R^*(\xi,\eta) + R(\xi,\eta)R^*(\xi,\eta)R^*(\xi,\eta) +\\ &\quad F_2(\xi,\eta)R^*(\xi,\eta)R^*(\xi,\eta) + F_2^*(\xi,\eta)R(\xi,\eta)R^*(\xi,\eta)\\ &= |F_2(\xi,\eta)|^2 R^*(\xi,\eta) + |R(\xi,\eta)|^2 R^*(\xi,\eta) +\\ &\quad F_2(\xi,\eta)|R^*(\xi,\eta)|^2 + F_2^*(\xi,\eta)|R(\xi,\eta)|^2\end{aligned}$$

where the first term, $|F_2(\xi,\eta)|^2 R^*(\xi,\eta)$ represents the intensity of the diffracted object wavefront combined with a background conjugate reconstruction wave.

The second term, $|R(\xi,\eta)|^2 R^*(\xi,\eta)$ is the intensity of the reference wave with a DC reconstruction beam component.

The third term, $F_2(\xi,\eta)|R^*(\xi,\eta)|^2$ is the diverging virtual image of the diffracted object wavefront plus conjugate reference intensity.

The fourth term, $F_2^*(\xi,\eta)|R(\xi,\eta)|^2$ is the conjugate object wavefront which converges to the plane of the scatterer along with background reference wave intensity.

Diffraction from the hologram back toward the plane of the scatterer is simply the reverse process of when the hologram was recorded, so complex conjugates of the original terms are used, i.e., $$F_2^*(\xi,\eta) = F_1^*(\xi,\eta) * T_1^*(\xi,\eta) H_1^*.$$

Inverse Fourier transforming thus becomes $$f^{-1}\{F_2^*(\xi,\eta)\} = f_1^*(x,y) t_1^*(x,y) * h_1^*$$

where fhu $-1$ denotes an inverse Fourier transform. Next, we substitute the conjugates of the original functions $$f_1^*(x,y)t_1^*(x,y)*h_1^* = A_1\exp[\pi(x^2+y^2)/d^2]\exp(-i\phi)\cdot{}^*\exp([(-i\pi/T\lambda)(x^2+y^2)]).$$

When this is recombined with the original phase scatterer the transmittance functions cancel. The impulse response of the system will also cancel the initial recorded impulse response. This leaves only the conjugate of the original Gaussian wave function $$A_1\exp[\pi(x^2+y^2)/d^2]\exp(-i\phi)\cdot\\ \exp(i\phi)*\exp([(-i\pi/T\lambda)(x^2+y^2)]\exp([(i\pi/T\lambda)(x^2+y^2)]) = A_1\exp[\pi(x^2+y^2)/d^2].$$

The conjugate of the original wavefront emerges from the system in a time reverse manner. It should be noted that in the reconstruction or end use stage of this device, it still behaves in a linear manner, yet is not shift invariant; i.e. a change in the angle of incidence of the reconstruction beam (the conjugate of the reference) or in its size or position on the recorded hologram surface, will not effect similar changes in the reconstructed wavefront. The conjugate output is invariant to the position of the reconstructing wavefront(s) in the sense that the output is constant in spatial profile.

We claim:

1. A method for holographically combining a plurality of laser beams, comprising the steps of:
    1) providing an optical device comprising:
        a) a support substrate having entrance and exit faces and comprising a monolithic block;
        b) means providing a diffusion surface on the entrance face; and
        c) means providing a light sensitive recording medium on the exit face;
    2) constructing a holographic recording by simultaneously:
        (i) directing a reference laser beam to the light sensitive recording medium; and
        (ii) directing an input laser beam through the diffusion surface of the entrance face for interfering with the reference beam at the exit face; and
    3) reconstructing a conjugate of the input beam by directing a plurality of conjugate reference laser beams to the holographic recording.

2. A method according to claim 1, the reconstructing step further comprising:
    selectively combining the conjugate reference beams for reconstructing the conjugate of the input beam in accordance with predetermined intensity levels corresponding to different numbers of conjugate reference beams directed to the recording.

3. A method for holographically combining a plurality of laser beams, comprising the steps of:
    1) providing an optical device defining a scattering plane spaced from a recording plane, a diffusing surface disposed on the scattering plane, and a light sensitive recording medium disposed on the recording plane;
    2) constructing a holographic recording by simultaneously:
        (i) directing a reference laser beam at a first angle in a first direction onto the recording medium; and (ii) directing an object laser beam through the diffusing surface so that elements of the diffusing surface spread the object beam over a common pupil area of the recording medium, in interference with the reference beam, to record a hologram of the spatial intensity profile of the resulting interference pattern onto the recording medium common pupil area; and 3) reconstructing an output laser beam from the optical device by directing a plurality of input laser beams at second angles, substantially the same as the first angle, in second directions opposite to the first direction, onto the recorded hologram; the input beams comprising time-reversed conjugates of the reference beam, and the hologram diffracting the input beams back toward the diffusing surface to form the output beam as a single combined time-reversed conjugate of the object beam.

4. A method according to claim 3, wherein the second angles are within 4° of the first angle.

5. A method according to claim 4, wherein the step of directing an object beam comprises directing a collimated beam through the diffusing surface, and the step of reconstructing an output beam comprises reconstructing a conjugate of the collimated object beam.

6. A method according to claim 3, wherein in the reconstructing step the input laser beams are selectively combined for reconstructing the output beam, in accordance with predetermined intensity levels of the output beam corresponding to different combined ones of the input beams.

7. A method according to claim 3, wherein the optical device provided in the providing step is a prism having an entrance face defining the scattering plane and an exit face defining the recording plane, with the diffusing surface of the scattering plane functioning in the constructing step so that each part of the entrance face spreads the object beam over the whole area of the exit face.

8. A method of recording and reconstructing a spatial intensity profile of a wavefront of a laser beam, comprising the steps of:

1) providing a scattering plane spaced from a recording plane, the scattering plane comprising a diffusing surface and the recording plane comprising a light sensitive medium;

2) constructing a holographic recording of an interference pattern of a spatial intensity profile of a wavefront of an object laser beam propagated through the diffusing surface onto the medium combined with a spatial intensity profile of a wavefront of a reference laser beam directed at an angle onto the same medium, each point of the diffusing surface acting to spread the incident object beam to all points of the medium, and the medium acting to record the resulting interference pattern; and 3) reconstructing the spatial intensity profile of the wavefront of the object beam by illuminating the holographic recording with a conjugate of the reference beam directed at the medium in a direction opposite to that at which the reference beam was directed, at an angle which is within 4° of the angle at which the reference beam was directed.

9. A method according to claim 8, wherein, in the reconstructing step, the spatial intensity profile of the object beam is reconstructed by illuminating the holographic recording with a selected number of a plurality of beams which are each conjugates of the reference beam and each directed at the medium in directions opposite to that at which the reference beam was directed, each at an angle which is within 4° of the angle at which the reference beam was directed, to form a single spatial intensity profile of the object beam having an intensity which varies in accordance with the number of the plurality of beams selected.

* * * * *